US012340411B2

(12) United States Patent
Phillips et al.

(10) Patent No.: US 12,340,411 B2
(45) Date of Patent: *Jun. 24, 2025

(54) COMPUTING TECHNIQUES TO PREDICT LOCATIONS TO OBTAIN PRODUCTS UTILIZING MACHINE-LEARNING

(71) Applicant: Capital One Services, LLC, McLean, VA (US)

(72) Inventors: Jeremy Phillips, Brooklyn, NY (US); Andrew Grossman, White Plains, NY (US); Catherine Bousquet, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,987

(22) Filed: Oct. 25, 2022

(65) Prior Publication Data

US 2023/0109673 A1 Apr. 13, 2023

Related U.S. Application Data

(63) Continuation of application No. 16/867,998, filed on May 6, 2020, now Pat. No. 11,514,504.

(51) Int. Cl.
| | |
|---|---|
| G06Q 30/00 | (2023.01) |
| G06F 3/0482 | (2013.01) |
| G06K 19/06 | (2006.01) |
| G06Q 10/0836 | (2023.01) |
| G06Q 10/087 | (2023.01) |
| G06Q 30/0251 | (2023.01) |
| G06Q 30/0601 | (2023.01) |

(52) U.S. Cl.
CPC ....... *G06Q 30/0639* (2013.01); *G06F 3/0482* (2013.01); *G06K 19/06009* (2013.01); *G06Q 10/0836* (2013.01); *G06Q 10/087* (2013.01); *G06Q 30/0261* (2013.01); *G06Q 30/0631* (2013.01); *G06Q 30/0635* (2013.01)

(58) Field of Classification Search
CPC ..................................................... G06Q 30/00
See application file for complete search history.

(56) References Cited

U.S. PATENT DOCUMENTS

| | | | |
|---|---|---|---|
| 9,141,987 B2 * | 9/2015 | Perks ................. | G06Q 30/0641 |
| 10,887,764 B1 * | 1/2021 | Mokady ................. | H04W 4/14 |
| 11,475,507 B2 * | 10/2022 | DeLuca ............. | G06Q 30/0637 |
| 2004/0153370 A1 * | 8/2004 | Yang ...................... | G06Q 10/08 |
| | | | 705/26.1 |
| 2009/0030771 A1 * | 1/2009 | Eder ...................... | G06Q 40/00 |
| | | | 705/35 |
| 2014/0236688 A1 * | 8/2014 | Minter ..................... | G07C 9/30 |
| | | | 705/26.8 |

(Continued)

OTHER PUBLICATIONS

Mehmandarov, Rustam, "Generating QR Codes With Secure Hashes Using Java", mehmandarov.com, dated Jun. 10, 2019. (Year: 2019).*

*Primary Examiner* — Mark A Fadok
(74) *Attorney, Agent, or Firm* — KDW Firm PLLC

(57) ABSTRACT

Various embodiments are generally directed to techniques utilizing computers to determine one or more locations for a customer to pickup a product based on a trained models. Embodiments may also include generating a code that may be utilized to obtain the product and perform a verification operation.

20 Claims, 9 Drawing Sheets

(56) References Cited

U.S. PATENT DOCUMENTS

| | | | |
|---|---|---|---|
| 2015/0193731 A1* | 7/2015 | Stevens | G06Q 10/083 |
| | | | 705/26.7 |
| 2017/0124511 A1* | 5/2017 | Mueller | H04W 4/029 |
| 2018/0082251 A1* | 3/2018 | Wilkinson | G06Q 30/0635 |
| 2019/0205939 A1* | 7/2019 | Lal | G06N 3/045 |
| 2020/0043073 A1* | 2/2020 | Greenberger | G06Q 10/0836 |
| 2020/0258041 A1* | 8/2020 | Fujisawa | G07C 9/22 |
| 2020/0265501 A1* | 8/2020 | Burks | A47J 31/46 |
| 2020/0302388 A1* | 9/2020 | Merle | G07C 9/00571 |
| 2021/0056615 A1* | 2/2021 | Vedula | G06Q 30/0639 |
| 2021/0065107 A1* | 3/2021 | Jajula | G06Q 10/087 |
| 2021/0097483 A1* | 4/2021 | Canseco | G06Q 10/0836 |
| 2021/0216959 A1* | 7/2021 | Hapgood | G06Q 30/0639 |
| 2021/0326966 A1* | 10/2021 | DeLuca | G06Q 30/0637 |

\* cited by examiner

200

- RECEIVE, VIA THE COMMUNICATION INTERFACE COUPLED WITH COMPUTING NETWORK, A REQUEST FROM A DEVICE ASSOCIATED WITH A CUSTOMER
205

- APPLY A TRAINED MODEL TO THE INFORMATION OF THE REQUEST TO DETERMINE ONE OR MORE PHYSICAL LOCATIONS OF A PRODUCT PROVIDER TO PROVIDE THE PRODUCT, THE TRAINED MODEL TRAINED WITH AT LEAST HISTORICAL LOCATION INFORMATION ASSOCIATED WITH THE CUSTOMER
210

- GENERATE A DIGITAL IDENTIFICATION CODE ASSOCIATED WITH THE REQUEST AND THE CUSTOMER
215

- SEND, VIA THE COMMUNICATION INTERFACE COUPLED WITH THE COMPUTING NETWORK, FIRST INFORMATION TO THE DEVICE ASSOCIATED WITH THE CUSTOMER, THE FIRST INFORMATION TO INCLUDE AN INDICATION OF AT LEAST ONE OF THE ONE OR MORE PHYSICAL LOCATIONS OF THE PRODUCT PROVIDER AND THE DIGITAL IDENTIFICATION CODE
220

- DETERMINE A DEVICE ASSOCIATED WITH THE PRODUCT PROVIDER TO PICK UP THE PRODUCT
225

- SEND, VIA THE COMMUNICATION INTERFACE COUPLED WITH THE COMPUTING NETWORK, SECOND INFORMATION TO THE DEVICE ASSOCIATED WITH THE PRODUCT PROVIDER, THE SECOND INFORMATION TO IDENTIFY THE PRODUCT AND THE DIGITAL IDENTIFICATION CODE
230

> RECEIVE, BY AN APPLICATION EXECUTING ON THE PROCESSOR CIRCUIT, AN INDICATION TO PURCHASE A PRODUCT
> 305

> CAUSE, BY THE APPLICATION EXECUTING ON THE PROCESSOR CIRCUIT, COMMUNICATION OF A REQUEST TO A SERVER ASSOCIATED WITH THE APPLICATION
> 310

> RECEIVE, BY THE APPLICATION EXECUTING ON THE PROCESSOR CIRCUIT, FIRST INFORMATION FROM THE SERVER, THE FIRST INFORMATION TO INCLUDE AN INDICATION OF ONE OR MORE PHYSICAL LOCATIONS OF A PRODUCT PROVIDER AND A DIGITAL IDENTIFICATION CODE
> 315

> DETECT, BY THE APPLICATION, A DEVICE ASSOCIATED WITH ONE OF THE ONE OR MORE PHYSICAL LOCATIONS OF THE PRODUCT PROVIDER
> 320

> CAUSE, BY THE APPLICATION, ONE OR MORE OF PRESENTATION OF THE DIGITAL IDENTIFICATION CODE ON A DISPLAY, COMMUNICATION OF THE DIGITAL IDENTIFICATION CODE VIA AN INTERFACE, AND/OR PLAYING OF THE DIGITAL IDENTIFICATION CODE VIA A SPEAKER
> 325

- RECEIVE AN INDICATION OF A PRODUCT PURCHASED AND A FIRST INSTANCE DIGITAL IDENTIFICATION CODE
  405

- RECEIVE AN INDICATION OF A SECOND INSTANCE OF A DIGITAL IDENTIFICATION CODE FROM A COMPUTING DEVICE ASSOCIATED WITH A CUSTOMER
  410

- DETERMINE WHETHER THE FIRST INSTANCE OF THE DIGITAL IDENTIFICATION CODE MATCHES THE SECOND INSTANCE OF THE DIGITAL IDENTIFICATION CODE
  415

- CAUSE AN ACTION IN RESPONSE TO DETERMINING THE FIRST INSTANCE MATCHES THE SECOND INSTANCE
  420

- PROHIBIT THE ACTION IN RESPONSE TO DETERMINING THE FIRST INSTANCE DOES NOT MATCH THE SECOND ISTANCE
  425

```
┌─────────────────────────────────────────┐
│ RECEIVE AN INDICATION OF A PRODUCT      │
│ PURCHASED FROM A SERVER                 │
│ 455                                     │
└─────────────────────────────────────────┘
                    │
┌─────────────────────────────────────────┐
│ RECEIVE AN INDICATION OF AN INSTANCE OF │
│ A DIGITAL IDENTIFICATION CODE FROM A    │
│ COMPUTING DEVICE ASSOCIATED WITH A      │
│ CUSTOMER                                │
│ 460                                     │
└─────────────────────────────────────────┘
                    │
┌─────────────────────────────────────────┐
│ COMMUNICATE THE INSTANCE OF THE DIGITAL │
│ IDENTIFICATION CODE TO THE SERVER       │
│ 465                                     │
└─────────────────────────────────────────┘
                    │
┌─────────────────────────────────────────┐
│ RECEIVE, FROM THE SERVER, AN INDICATION │
│ INDICATING WHETHER THE DIGITAL          │
│ IDENTIFICATION CODE IS VERIFIED OR NOT  │
│ VERIFIED                                │
│ 470                                     │
└─────────────────────────────────────────┘
                    │
┌─────────────────────────────────────────┐
│ CAUSE AN ACTION IN RESPONSE TO THE      │
│ INDICATION INDICATING THE DIGITAL       │
│ IDENTIFICATION CODE IS VERIFIED OR NOT  │
│ VERIFIED                                │
│ 475                                     │
└─────────────────────────────────────────┘
```

*FIG. 4B*

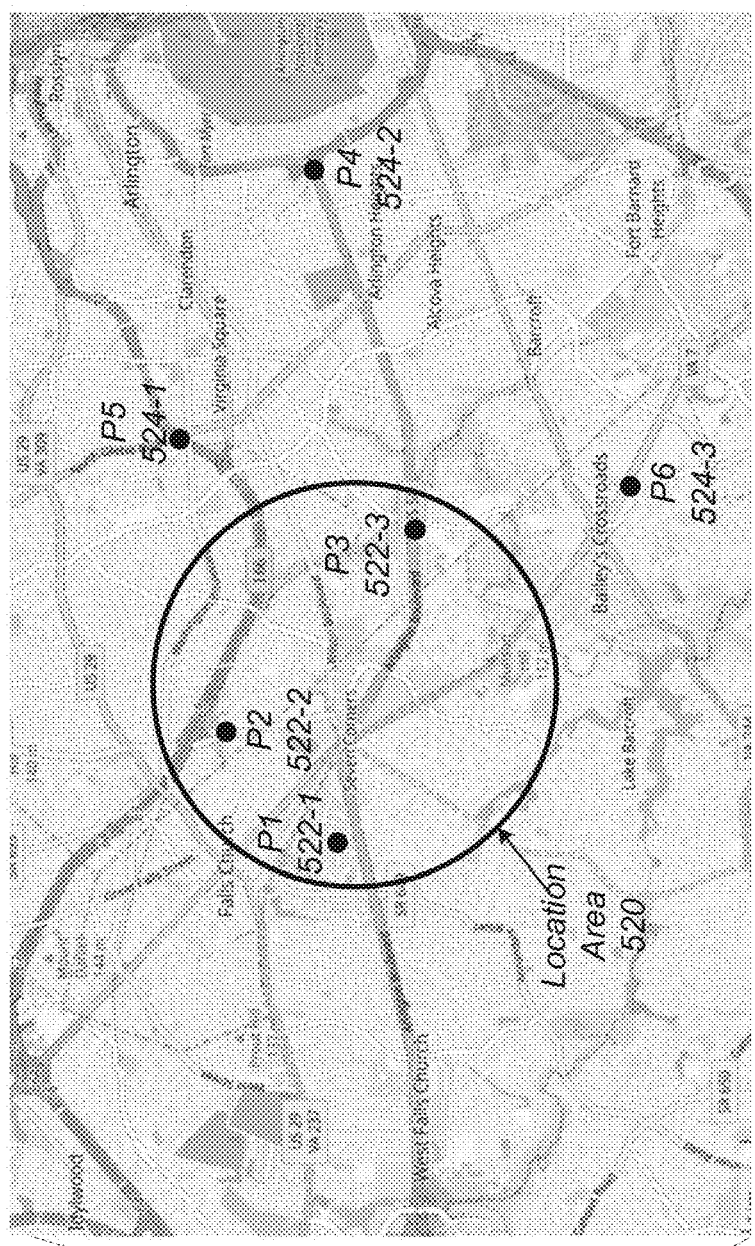
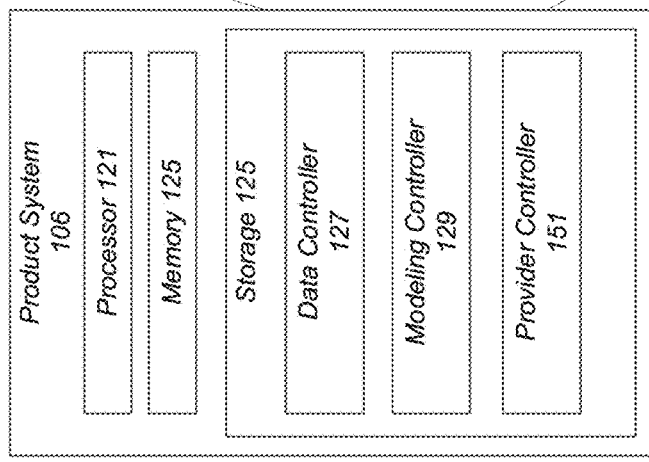
FIG. 5B

COMPUTING TECHNIQUES TO PREDICT LOCATIONS TO OBTAIN PRODUCTS UTILIZING MACHINE-LEARNING

CROSS-REFERENCE TO RELATED APPLICATIONS

This application is a continuation of U.S. patent application Ser. No. 16/867,998 filed on May 6, 2020, the disclosure of which is incorporated herein by reference in its entirety.

BACKGROUND

Generally, people are required to enter store locations to shop and purchase products. Shopping can be inconvenient and cause people to spend time that they could use doing more productive activities. In addition, people may waste more time when a particular store does not have a product and the person has to go to one or more additional locations. Some stores may offer curbside pickup or at home delivery services, but these services are generally unsophisticated. For example, if a store does not have a particular item, a shopper may pick an alternative that a person does not like or the user may be required to be in constant communication with the shopper to provide acceptable alternatives. Embodiments discussed herein may be directed to fixing these and other issues to make obtaining items with less hassle.

SUMMARY

Embodiments are generally directed to predicting locations to obtain products utilizing machine-learning. In one example, embodiments may includes systems, device, and so forth to process a request comprising, a product identifier to identify a product to purchase, a customer identifier to identify a customer associated with the request, and location information associated with a device, and determine at least one physical location of a product provider capable of providing the product. A system may further generate a digital identification code for the request, the digital identification code to identify at least one of the customer, and a device associated with the customer. The system to communicate an indication to the device associated with the customer, the indication to indicate at least one of the at least one physical locations of the product provider and the digital identification code, and communicate another indication to a device associated with the product provider, the other indication to identify the product and the digital identification code.

BRIEF DESCRIPTION OF THE DRAWINGS

FIG. 2 illustrates an example of a first logic flow to predict a location to pick up a product.

FIG. 3 illustrates an example of a second logic flow to predict a location to pick up a product and perform the pickup.

FIG. 4A illustrates an example of a third logic flow to enable pickup of a product.

FIG. 4B illustrates an example of a fourth logic flow to enable pickup of a product.

FIG. 5B illustrates an example of a graphical representation of predicted locations.

DETAILED DESCRIPTION

Figure 1A:
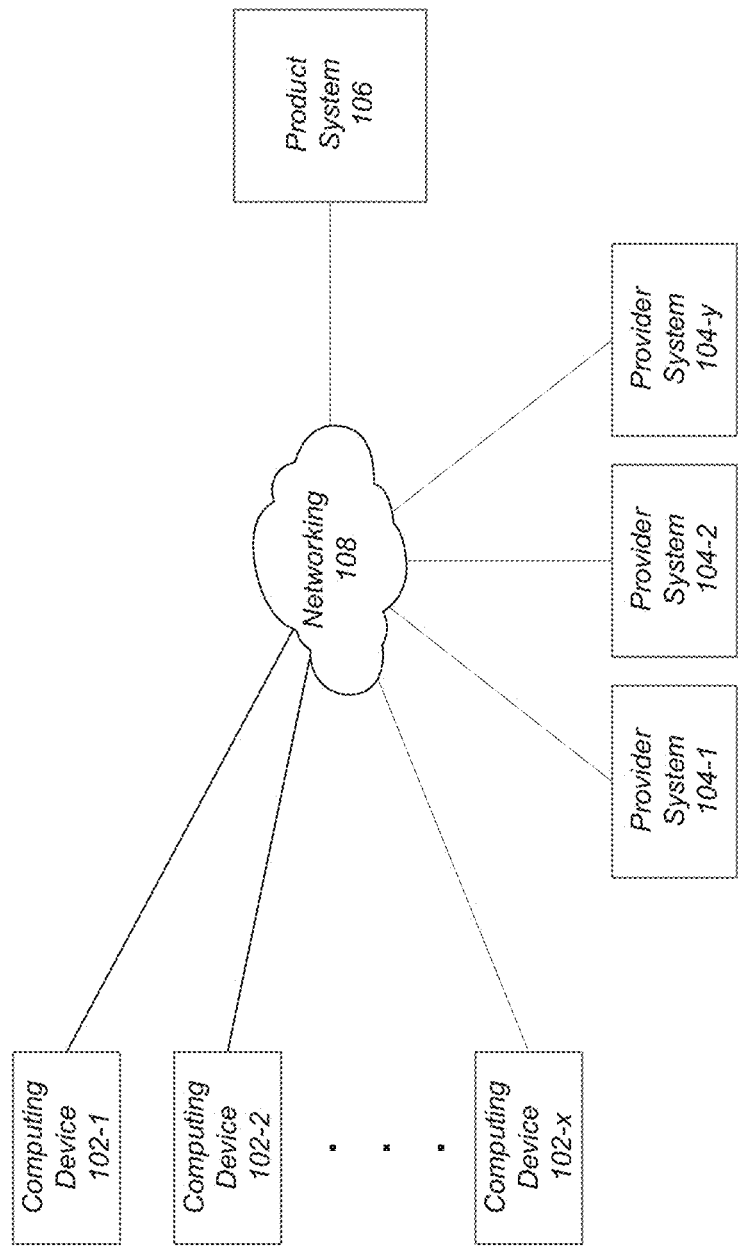
FIG. 1A/1B illustrates an example configuration of a system to determine a location to pick up a product.

Various embodiments are generally directed to techniques and systems to process product requests to purchase products and provide the products in a convenient manner at a physical location for pickup. For example, embodiments may include a system having one or more servers capable of processing requests for products, determining convenient location(s) where the customer can obtain the product, and providing the locations to a device associated with the customer. In addition, the system may also notify a system or server associated with the specific location for pick up such that the product can be staged for fulfillment.

In one specific example, a server of a product system may receive a request for one or more products. The request may be received from a device associated with a customer. The request may include information to identify a product to purchase, identify a customer associated with the request, and location information associated with the customer. The server may apply a trained model to the information of the request to determine one or more physical locations of a product provider to provide the product. The trained model may be trained with at least historical location information associated with the customer.

In some embodiments, the system may secure the pickup process by utilizing a code, such as a digital identification code associated with the request and the customer. The digital identification code may be provided to the customer by sending the code to the customer's device, such as a mobile phone. The customer may then provide the code to the system at the location of pickup to obtain the product. For example, the system at the location may receive an indication of the digital identification code and may compare the code received from the customer's device with an verified copy of the code received from the product system. If the codes match, the system may enable the customer to obtain the product. However, if they do not match the system may prevent the customer from obtaining the product.

Embodiments discussed herein provide tangible improvements over existing systems by determining locations convenient for a customer based on machine-learning predictions. Improvements also include enabling customers to obtain the product in a secure manner to prevent potential fraud and abuse. Additional details will be discussed in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example of a computing system 100 to process information and data enable a customer to purchase a product, utilize machine-learning to predict a location to obtain the product for the customer, and provide the product for the customer to obtain in a secure manner at the location. For example, a customer associated with a customer account may utilize a computing device, such as a mobile phone, to purchase a product from a seller having one or more physical locations near the customer. A server, associated with the seller, may receive the request and process the request by applying a machine-learning model to the request to determine at least one likely location where the customer may obtain the product. For example, the location may be predicted by on at least historical habits used to train the machine-learning model. The server may communicate with the computing device and customer to provide an indication of the location and a code, e.g., a digital identification code, that may be used to obtain the product. The server may also communicate with a computing device of a provider system associated with the location, where the product is to be obtained, an indication of the product purchased, and in some instances, an indication of the digital identification code. The customer may go to the location, provide the code to the provider system, and obtain the product if the customer is verified via the digital identification code.

In the illustrated example, system 100 includes one or more computing devices 102-x, where x may be any positive integer. A computing device 102 may be able to process information and data and communicate via one or more interfaces. For example, a computing device 102 may be capable of accessing networks including the Internet, websites, local area networks, cloud-based systems, remote systems, etc., via one or more wireless and wired networking connections, e.g., computing networking 108. For example, a computing device 102 may communicate with a server associated with a product system 106 to enable a customer to purchase a product based on customer interactions with a web browser or an application. In another example, the computing device 102 may communicate, via network 108 and/or a direct connection, with the provider system 104 at a physical location to obtain the product purchased. In embodiments, the computing device 102 is capable of communicating with other devices and embodiments are not limited in this manner.

In embodiments, a computing device 102 may be a device, such as a personal computer, a desktop computer, a laptop computer, a tablet computer, a server, an embedded computer, a netbook, a mobile device, a mobile phone, a personal digital assistant, a handheld computer, a workstation, etc. Moreover, a computing device 102 may be any type of device capable of communicating with other devices including devices associated with a provider system 104 and/or product system 106. As will be discussed in more detail in FIG. 1B, a computing device 102 may include one or more processors coupled with memory and storage.

The system 100 may also include one or more provider systems 104-y, where y may be any positive integer. A provider system 104 may be any type of computing system. For example, a provider system 104 may include one or more servers having processors, memory, components, and controllers to perform the operations discussed herein. In instances, the provider system 104 may be a cloud-based system where one or more resources, such as the processors, memory, and storage may be allocated on a need basis to perform operation discussed herein. In other instances, a provider system 104 may include in-house or local computing where the resources are owned and operated by a corporation.

In embodiments, a provider system 104 may communicate with one or more computing devices 102 and product system 106 via networking 108. For example, the provider system 104 may communicate one or more communications with computing device 102 and/or product system 106 to enable a customer to purchase a product and obtain the product at a location associated with the provider system 104. The communications may include receiving an indication from the product system 106 of a product purchased by the customer. In some instances, the provider system 104 may receive additional information from the product system 106, e.g., information to identify the customer and/or a customer account associated with the customer, a digital identification code associated with the product request, estimated time for the product to be obtained, and so forth.

In embodiments, the provider system 104 may also communicate information with the computing device 102. For example, the provider system 104 may receive an indication of a digital identification code for a product request from the computing device 102 that may be used by the customer to obtain the product. The provider system 104 may utilize the digital identification code received from the computing device 102 to verify the customer. More specifically, the provider system 104 may compare the digital identification code received from the product system 106, e.g., the verified digital identification code, with the digital identification code received from the computing device 102 to determine if they match. If they match, the provider system 104 may cause one or more actions or operations to enable a customer to obtain the product. However, if they do not match the provider system 104 may prevent the customer from obtaining the product.

In some instances, the provider system 104 may not receive an indication of a digital identification code from the product system 106 but may only receive the digital identification code from the computing device 102. In this example, the provider system 104 may send the digital identification code received from the computing device 102 to the product system 106. The product system 106 may process the digital identification code and determine whether the code verifies or does not verify the customer, e.g., matches or does not match the verified digital identification code. The provider system 104 may then receive an indication based on the determination made by the product system 106 indicating whether the customer is verified or not verified.

In embodiments, system 100 may include a product system 106 may communicate with one or more computing devices 102-x and provider systems 104-y, as previously discussed. The product system 106 may process information and data to process requests for products and enable customers to obtain the products at specific locations. For example, the product system 106 may receive a product request, apply a trained model to the product request to determine a location to obtain the product, and communicate with the computing device 102 and a corresponding provider system 104. Further, the product system 106 may train one or more models, which may be associated with a particular customer or group of customers, by utilizing training data, such as historical data relating to the customer.

In some instances, the product system 106 may add a level of security to the product pickup process by utilizing a unique code or identifier to verify the customer when they are obtaining the product, e.g., the digital identification code. For example, the product system 106 may generate a digital identification code for the product request. The digital identification code may be communicated to the computing device 102 associated with the customer and the customer may utilize the digital identification code to obtain the product, e.g., provide it to the provider system 104. For example, the customer may cause the digital identification code to be communicated to the provider system 104 associated with the location where the customer is picking up the product via the computing device 102 and the provider system 104 may utilize the digital identification code to verify the user, as previous discussed.

The following use case scenario is one specific example of a customer purchasing a product in a banking environment. However, embodiments are not limited to this example. In this example, a customer may desire to purchase a banking product, such as checks, deposit slips, stamps, transaction cards (debit and credit cards), money orders, cashier checks, traveler's checks, and so forth. These products may include information private to the customer, e.g., a bank account number, a credit/debit card number, the customer's address, and/or access to private data/funds, e.g., money in a savings or checking account, charges on a credit card, and so forth. Thus, banks typically provide these products through secure means, e.g., via walking up to a bank teller, through an ATM, or through the mail. Thus, a customer may waste time waiting to speak with a bank teller and/or may not receive the product in a timely manner if it's delivered through the mail. At least one advantage systems discussed herein have over prior systems is that it enables customers to quickly access and obtain a product in a secure manner with no or little interaction with a bank teller or merchant and does so in at a location that is convenient to the customer.

Embodiments discussed herein enable a customer, utilizing a computing device 102, such as a mobile phone or personal computer, to purchase a product from a bank retailer and pick up the product at a branch location of the bank. For example, the customer, utilizing a web browser or app on the computing device 102, may submit a product request to the bank retailer through a web portal or connection with a server of the bank retailer, e.g., product system 106. The product system 106 may include a trained model associated with the customer and trained using historical data, e.g., historical location data indicating times and locations of the customer. The model may be trained to detect a customer going to work in the morning, going to lunch at a particular place on a particular day, taking and picking up children from school, going home from work, going to the grocery store on a particular day/time, and so forth. Thus, the model may be used to determine branch locations that are near the customer at specific times of the day.

In embodiments, the product system 106 may receive the product request from the computing device 102 and apply the model to the request to determine one or more locations for the customer to pick up the product, e.g., on the way to work, taking the children to school, on the way home from work, while out shopping at a grocery store, and so forth. The product system 106 may provide an indication of the one or more locations to the customer and the customer's computing device 102. In embodiments, the product system 106 may take other considerations into account when determining the one or more locations that may provide the product for the customer, e.g., availability of the product at the location, current location of the customer, availability of the customer (appointments, meetings, events, etc.), weather, etc. For example, the product system 106 may determine one or more locations based on the output of applying the trained model and then narrow down the list of locations based on the other considerations associated with the customer. The product system 106 may communicate an indication of a single location or a few choices for the customer to choose which location.

In instances, the product system 106 may generate a digital identification code, associate the code with the product request, and provide the code to a computing device 102 associated with the customer. The digital identification code may be a one-time code that may only be used to obtain the product corresponding to the product request. The digital identification code may be any type of code or password, such as an alphanumeric code, barcode image, digital audio code, and so forth. In one example, the customer may travel to the location determined by the product system 106 and/or chosen by the customer and the customer may utilize the computing device 102 to provide the digital identification code to the provider system 104 associated with the location. The provider system 104 may detect and/or receive the digital identification code and verify the customer and computing device 102, as previously discussed. The computing device 102 may communicate the digital identification code to the provider system 104 via a wireless connection, e.g., WiFi, Bluetooth, Infrared, etc. or other means based on the form of the code. For example, the code may be a barcode and the provider system 104 may include a barcode scanner that may scan the barcode displayed on a display of the computing device 102. In another example, the digital identification code may be a digital audio code, which may be audible or inaudible to a human, and may be communicated to the provider system 104 via a speaker of the computing device 102. The provider system 104 may include a microphone capable of detecting the digital identification code in the audio format.

The provider system 104 may receive the digital identification code and verify the customer based on the digital identification code, e.g., the provided code matches a verified code. If the provider system 104 does not verify the customer, the provider system 104 may prevent the customer from accessing the product, e.g., send one or more control signals to a control device to prevent access. For example, the product may be stored in a storage locker, e.g., locked storage box and the provider system 104 may prevent the customer from open the storage locker door storing the product. In this example, the control device may be an electronically controlled lock on the storage locker to prevent the locker opening. In another example, the provider system 104 may prevent access to the building (door) for the customer. Similarly, the provider system 104 may send one or more signals to a control device such as an electronic lock on the door of the building. In a third example, the product may be stored and/or provided by an automatic teller machine (ATM) and the provider system 104 may prevent the ATM from disbursing the product. In this example, the provider system 104 may send one or more messages including an indication to not dispense the product, e.g., deny the customer access.

In embodiments, the provider system 104 may send one or more control signals to a control device to enable a customer to obtain the product when the provider system 104 verifies the customer based on the digital identification code. For example, the provider system 104 may send a signal to unlock an electronic lock of a locked storage box, a signal to an electronic lock to unlock a door for the customer, and/or a signal to cause the ATM to disburse the product. Embodiments are not limited to these examples, and other control devices may be utilized to secure the product and controlled by the provider system 104. In embodiments, the provider system 104 may communicate the one or more signals and/or messages with a control device via a banking network which may include wired and wireless connections. In embodiments, the data may be sent in a secure encrypted format and in accordance with a protocol such as a multiprotocol label switch (MPLS) protocol using virtual private networks (VPNs).

Figure 1B:
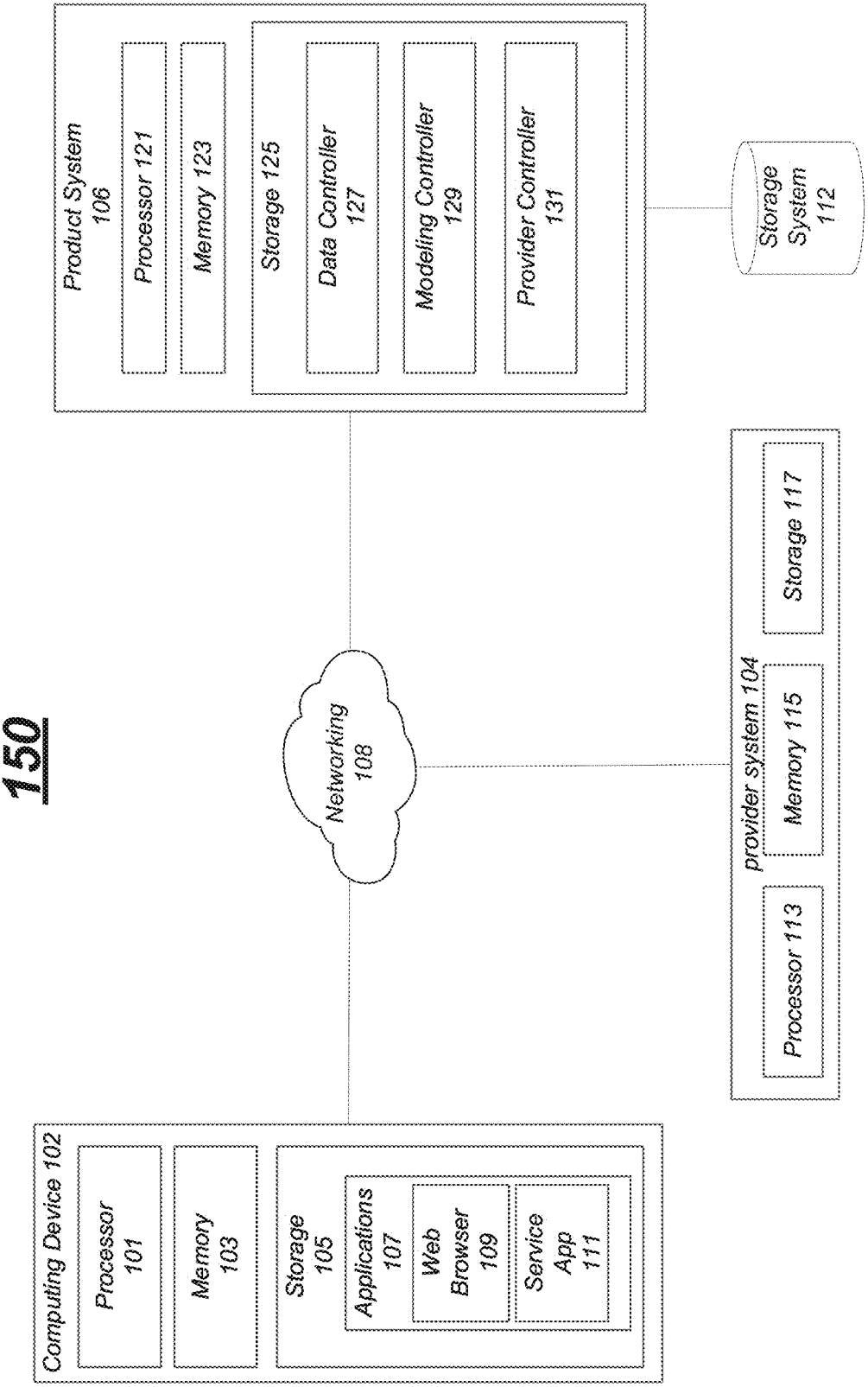

FIG. 1B illustrates a detailed view of system 100, computing device 102, and systems 104 and 106. In embodiments, the computing device 102 includes processor 101, memory 103, and storage 105. The processor 101 may include one or more processing cores to process information and data. Moreover, a processor 101 can include one or more processing devices, such as a microprocessor manufactured by Intel™, AMD™, or any of various processors. The disclosed embodiments are not limited to any type of processor(s).

Coupled with the processor 101, the computing device 102 may also include memory 103. The memory 103 can include one or more types of memory (volatile or non-volatile) devices configured to store instructions used by the one or more processors 101 to perform one or more operations consistent with the disclosed embodiments. For example, the memory 103 can be configured with one or more software instructions, such as programs and applications that can perform one or more operations when executed by the processor 101. In embodiments, the memory 103 may store instructions and data on a temporary basis as they are about to be processed by the processor 101.

In embodiments, the computing device 102 may further include a storage device 105 coupled with the processor 101 and memory 103. The storage device 105 may include HDDs, flash memory devices, optical storage devices, floppy storage devices, etc. In some instances, the storage devices 105 may include cloud-based storage devices that may be accessed via a network interface. The storage device 105 may store one or more applications 107 that include instructions that may be executed by the processor 101.

In embodiments, one or more applications 107 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. The one or more applications may also include a web browser 109, such as Chrome®, Internet Explorer®, Safari®, Firefox®, and so forth. The web browser 109 may be utilized by a user or customer through a graphical user interface (GUI) to surf or browse websites. Browsing websites may include causing the computing device 102 to communicate one or more messages with other devices via networking 108. These communications include requests and responses for a particular website, such as the product and provider systems 104 and 106. In some instances, the web browser 109 may be used to access a banking website and one or more accounts associated with the product system 106 to request the products corresponding to the one or more accounts.

The one or more applications 107 may also include one or more applets or apps 111, such as a banking app. An app 111 includes instructions, that when executing, may also enable the application to communicate with systems 104 and 106. For example, a banking app may include instructions to present a GUI to a customer via a display device and enable the customer to perform banking functions including purchasing products from a bank's product system 106. A customer may access the banking functions through the banking app and GUI by logging into an account associated with the bank and sending one or more requests to the product system 106, for example. The customer may then order products and perform other banking functions with the banking system including the product system 106.

Further, embodiments include the computing device 102 communicating with the provider system 104 based on customer interactions with the web browser 109 and/or app 111. For example, a customer may interact with a GUI of the web browser and/or app 111 to send the digital identification code to the provider system 104 via one or more communications. In one example, a customer may interact with the GUI of a web browser 109 or app 111 to cause the digital identification code to be communicated via one or more wireless communications. In another example, the customer may interact with the GUI to cause a barcode or QR code to be presented on a display device of the computing device 102. A scanning device of the provider system 104 may scan the barcode or QR code. In a third example, a user interacting with the GUI may cause an audio code to be transmitted by a speaker of the computing device 102 that may be detected by a microphone of the provider system 104. Embodiments are not limited to these examples.

In embodiments, the system 100 may include one or more provider system(s) 104 and each may include one or more processors 113 coupled with memory 115, and storage 117. Each of the provider systems 104 may also be associated with a particular location or store where a product can be picked up, e.g., a bank branch. In other instances, a provider system 104 may correspond to two more locations or stores. Embodiments are not limited in this manner.

In embodiments, a provider system 104 may communicate information and data with the product system 106 and/or one or more computing devices 102. For example, the provider system 104 may receive an indication of a product request from the product system 104. The request may include information, such as the product purchased, time of pickup, customer identification, account information, the digital identification conde, and so forth. The provider system 104 may also receive information and data from computing devices 102 including digital identification codes. The provider system 104 may utilize the instance of the digital identification code received from the product system 106 and the instance of the digital identification code received from the computing device 102 to verify a customer, e.g., if they match the customer may be verified. Note that the provider system 104 may first ensure and/or determine corresponding digital identification codes based on another identifier. For example, the provider system 104 may utilize customer identifier, a purchase identifier, a product identifier, etc. to ensure that two of the digital identification codes are related, e.g., for the same purchase request.

In some instances, the provider system 104 may not receive a digital identification code from the product system 106. In this example, the provider system 104 may only receive a digital identification code from a computing device 102 and the provider system 104 may communicate the digital identification code to the product system 106. The product system 106 may perform the verification and return the result to the provider system 104. Note in some instances, the provider system 104 may provide additional information with the digital identification code to the product system 106, e.g. an identifier to ensure to associate the digital identification code with a particular purchase request.

In embodiments, a provider system 104 includes one or more processor(s) 113, which can include any type of one or more processing devices, such as a microprocessor manufactured by Intel™, AMD™, or any of various processors. The memory 115, coupled with the one or more processors 113, can include volatile and/or non-volatile memory devices configured to store instructions used by the one or more processors 113 to perform one or more operations consistent with the disclosed embodiments. For example, memory 115 can be configured with one or more software instructions, such as programs and applications that can perform one or more operations when executed by the processor 113. In embodiments, the memory 115 may store instructions and data on a temporary basis as they are about to be processed by a processor 113.

In embodiments, the service system 104 may further include a storage device 117 coupled with the processors 113 and memory 115. The storage device 117 may include HDDs, flash memory devices, optical storage devices, floppy storage devices, etc. In some instances, a storage device 117 may include cloud-based storage devices that may be accessed via a network interface. The storage device 117 may store one or more applications and controllers that include instructions that may be executed by the processor 113 to perform the operations discussed herein.

In embodiments, the service system 104 may include an operating system, such as Windows®, Chrome®, Linux®, Apple OS®, and so forth. The operating system may enable other software applications to access and communicate with hardware devices. An application, which may include one or more instructions, may be configured to interact with the hardware devices, collect data from the hardware devices, and communicate with other systems. The provider system 104 can include one or more additional applications to enable communication with a product system 106 and computing devices 102, as discussed. Further, the provider system 104 may include one or more applications to provide or deny access to a product for a customer.

In embodiments, the system 100 includes a product system 106 having a number of components and devices to perform the operations discussed herein. In embodiments, the product system 106 may include a number of servers in a server cluster or server farm architecture, for example. However, in other instances, the product system 106 may be implemented in one server or computing device. The product system 106 includes one or more processors 121, memory 123, and storage 125. In embodiments, the processors 121 can include any type of one or more processing devices, such as a microprocessor manufactured by Intel™, AMD™, or any of various processors.

The memory 123, coupled with the one or more processor(s) 121, can include volatile and/or non-volatile memory devices configured to store instructions used by the one or more processors 121 to perform one or more operations consistent with the disclosed embodiments. For example, memory 123 can be configured with one or more software instructions, such as programs and applications that can perform one or more operations when executed by the processor 121. In embodiments, the memory 123 may store instructions and data on a temporary basis as they are about to be processed by the processor 121.

In embodiments, the product system 106 may further include a storage 125 coupled with the processors 121 and memory 123. The storage device 125 may include HDDs, flash memory devices, optical storage devices, floppy storage devices, etc. In some instances, the storage devices 125 may include cloud-based storage devices that may be accessed via a network interface. The storage device 125 may store one or more applications and controllers that include instructions that may be executed by the processor(s) 121 to perform the operations discussed herein. In some embodiments, the product system 106 may be coupled with a separate storage system 112 including a storage structure, such as a database, to store the service billing data received from a service system 104.

In embodiments, the product system 106 may include an operating system, such as Windows®, Chrome®, Linux®, Apple OS®, and so forth. An operating system may enable other software applications to access and communicate with hardware devices. An application, which may include one or more instructions, may be configured to interact with the hardware devices, collect data from the hardware devices, and communicate with other systems. For example, the product system 106 may include a data controller 127, a modeling controller 129, and a provider controller 131, and the operating system may enable one or more of the controllers to perform operations discussed herein.

In embodiments, the data controller 127 may collect or receive data generate models and process requests for products. For example, the data controller 127 may receive data from one or more computing devices 102 associated with customers to train one or more models. The data may be stored in storage 112 and include location data indicating a location of a customer and computing device 102, time data including a timestamp of when the location data was collected, and customer and/or customer account identifier to identify the customer and/or a customer account associated with the location data. The data may include additional information, such as a device identifier. The data may be accessible to the other components of the product system 106, e.g., the modeling controller 129 to generate models.

The data controller 127 may collect and/or receive the data on a periodic or semi-periodic basis, e.g., thirty-minute intervals. The periodic interval may be set such that the data collected is granular enough to be used to train a model to accurately predict a location of a customer, while not overburdening data transmission usage or affecting a customer's user experience, e.g., interfere with other data, use battery above a certain amount, increase data transmission cost above a threshold, etc. In some embodiments, the interval to collect data may be set by the customer and/or an administrator of the system. In embodiments, the data controller 127 may collect the data and cause storage of the data in the storage system 112.

The data controller 127 may receive and process other data, e.g., product requests. The product requests may include an identifier of one or more products to be purchased by a customer, a customer and/or customer account identifier, the desired time of pickup of a product, and so forth. The data controller 127 may also make this data available to the components of the product system 106, e.g., the modeling controller 129 to apply a model to the data, the provider controller 131 to determine a provider for an order and to communicate the data with a provider system 104.

In embodiments, the product system 106 includes a modeling controller 129 to generate one or more models to predict locations of customers. A model may be trained on training data, which may include real data and/or simulated data. For example, the modeling controller 129 may utilize the data collected by the data controller 127 and stored in storage system 112 to train the models. In one example, the modeling controller 129 may use data collected for a customer to train a model for that particular customer. In other instances, the modeling controller 129 may use data collected for a plurality of customers to train a model to predict locations for one or more customers. The modeling controller 129 may utilize clustering techniques to generate clusters of like customers and train a model for each of the clusters, for example. The modeling controller 129 may further retrain each of the models as additional data is collected for the customers.

In embodiments, the modeling controller 129 may also utilize trained models to determine locations for customers. For example, the modeling controller 129 may determine a trained model associated with a customer and apply the trained model to a product request from that customer. In some instances, the result of applying the model may indicate the best location for the customer. The best location may be the location having the highest probability of being convenient to the customer based on the application of the model, for example. In other instances, the modeling controller 129 may determine the number of locations to propose to the customer. For example, the modeling controller 129 may return the best three locations to the customer, e.g., the three locations having the highest probability of being convenient to the customer. Embodiments are not limited to this example.

In embodiments, the product system 106 includes a provider controller 131 to enable a user to pick up a product at a location. For example, the provider controller 131 may process product requests, generate digital identification codes, and communicating with computing devices 102 and provider systems 104. By way of example, FIG. 2 illustrates a logic flow 200 to process a product request. FIG. 2 illustrates an example of a logic flow 200 that may be representative of some or all of the operations executed by embodiments described herein, e.g., the product system 106 and controllers.

With reference to FIG. 2, the logic flow 200 includes receiving a request from a device associated with a customer to purchase a product, e.g., a product request, at block 205. In embodiments, the request may be received by the product system 106 from a computing device 102 via one or more wireless and/or wired network connections. The request may include product information to identify a product to purchase, customer information to identify a customer associated with the request, and location information associated with the customer. The information to identify the product to purchase may include a product identifier, such as an alphanumeric string that is uniquely associated with the product. The information to identify the customer associated with the request may also include an alphanumeric string that may be used to uniquely identify the customer. In some instances, the information to identify the customer may identify an account associated with the customer, e.g., a customer account identifier. The location information may include an indication of the location of the customer and/or the customer's computing device 102 at a time a measurement was taken. For example, the customer's computing device 102 may capture its location utilizing the Global Positioning System (GPS) and provide the captured location to the product system 106.

The product system 106 may receive the request and process the request to provide the product for the customer. At block 210, the logic flow 200 includes applying a trained model to the information of the request to determine one or more physical locations of a product provider to provide the product. In one example, each of the one or more locations of the product provider may be a branch location of a bank, but embodiments are not limited in this manner. In one example, the product system 106 may predict a location area of the customer when applying the trained model to the information of the request to determine the one or more physical locations. The location area may be a 2 square mile (sq mi) area and the product system 106 may determine physical locations or branches having the product with the location area, and in some instances, which location is closest to the customer. Embodiments are not limited to the above location area size. The size and shape of the location area may be set by a customer or administrator of the product system 106. In other instances, the product system 106 may determine the location area size based on an accuracy threshold. For example, if 90% accuracy is desired the product system 106 may set the location area at 2 sq mi; however, if 80% accuracy is desired, the product system 106 may set the location to 1 sq mi.

In embodiments, the product system 106 may determine the trained model to apply to the information of the request based on the information to identify the customer associated with the request. For example, the request may include a customer identifier or a customer account identifier, and the product system 106 may perform a lookup in a data structure stored in the storage system 112 to determine an associated trained model. The product system 106 may retrieve the trained model from the storage system 112 to apply the information in the request to it.

In embodiments, the logic flow 200 includes generating a digital identification code associated with the request and the customer. For example, the product system 106 may utilize a random number or character generator to generate the digital identification code. In this example, the digital identification code may consist a string of randomly generated alphanumeric characters to associated with the product request. In another example, the product system 106 may use a barcode generator to generate a barcode to use as the digital identification code. The barcode may be any type of barcodes such as QR, UPC-A, EAN-8, EAN-13, code39, code128 and ITF barcodes. In another example, the product system 106 may utilize a digital audio generator to generate a digital audio code.

In embodiments, the logic flow 200 includes sending information to the device associated with the customer at block 215. The information may include an indication of at least one of the one or more physical locations of the product provider and the digital identification code. As discussed, the digital identification code may include an alphanumeric code, a barcode, a digital audio code, and so forth. The code may be presented on a GUI of the computing device 102 and/or communicated to a provider system 104.

The indication of a physical location may include an address of the location or latitude/longitude coordinates of the location. In some instances, the indication may include a link to cause a map application to open with the directions to the location. The link may be a universal resource locator (URL) or a small URL, for example. A customer may cause the link to execute to open the map program and/or the map may automatically execute when the link is received. In some instances, the product system 106 may send a single location to the customer's computing device 102, e.g., as determined to have the highest probability to be most convenient for the customer. In other instances, the product system 106 may send a plurality of locations to the customer's computing device 102, and the customer may choose one of the suggested locations via a GUI, for example. The product system 106 may receive an indication of the selected location from the customer's computing device 102.

In embodiments, the logic flow 200 may include determining a device or system associated with the product provider to pick up the product. For example, the product system 106 may determine a provider system 104 and/or a computing device or server of a provider system 104 associated with the location where the product is to be picked up.

In embodiments, the determination may be based on the single location provided to the customer and/or the location chosen by the customer. The product system 106 may store a data structure, e.g. data entries in a database, in the storage system 112, indicating provider systems 104 associated with locations. Thus, based on the determined location, the product system 106 may perform a lookup in the data structure to determine the associated provider system 104. The information in the database may include an Internet Protocol (IP) address, a URL, or some other identifier that may be used to communicate with the particular provider system 104.

At block 230, the logic flow 200 includes sending information to the device associated with the product provider, e.g., a provider system 104 associated with the location. The information may identify the product and the digital identification code. The provider system 104 may utilize the digital identification code to verify the customer based on a comparison of another instance of the digital identification code received from the customer's computing device. The provider system 104 may also utilize identifying information to identify the product to provide the customer. In some instances, the identifying information may be provided to a user of the provider system 104 and the user may make the product available for the customer. The identifying information may include a Unique Product Code (UPC), Unique Product Identifier (UPI), a Merchant Product Number (MPN), a European Product Number (EPN), or any other type of identifier that may be used to identify the product.

In some instances, as discussed, the product system 106 may not send the digital identification code to the provider system 104. In these instances, the provider system 104 may receive a digital identification code from the customer's computing device 102 and may send it to the product system 106 so that verification can be performed, as previously discussed.

FIG. 3 illustrates a logic flow 300 that may be performed by a computing device 102 to obtain a product. FIG. 3 illustrates an example of a logic flow 300 that may be representative of some or all of the operations executed by embodiments described herein by the computing device 102 executing one or more applications, e.g., a banking application and/or a web browser.

At block 305, the logic flow 300 includes receiving an indication to purchase a product. For example, a customer interacting with a GUI presented by an application may enter one or more inputs to select a product the customer desires to pick up at a physical location. The computing device 102, via the application, may present one or more visual representations of each of the products provided by the product provider in a GUI on the display and receive a selection of the product from the visual representations of each of the products presented in the GUI, for example. In embodiments, the customer may provide the one or more inputs through an input device of the computing device 102. Examples of an input device may include a touchscreen interface, one or more buttons, a scroll wheel, and so forth. The input may be detected by the operating system of the computing device 102 and provided to the application.

In embodiments, the logic flow 300 includes causing communication of a request to a server associated with the application at block 310. The server may be part of the product system 106, for example, and an application may cause the communication by sending one or more messages through a networking interface of the computing device 102. The request may include information to identify the product to purchase, information to identify a customer associated with the request, and location information associated with the customer.

In embodiments, the logic flow 300 may include receiving information from the server at block 315. The information may include an indication of one or more physical locations of a product provider and a digital identification code. In some instances, the indication of the one or more physical locations may be a single location having the highest probability of being a location most convenient to the customer. In other instances, the indication may include multiple physical locations and the customer may choose which location is best. For example, the application may cause presentation of each of the one or more physical locations of the product provider in the GUI for selection. The application may receive a selection of one of the one or more physical location of the product provider via an input device, and cause communication of an indication of a selected one of the one or more physical locations of the product provider.

In some instances, embodiments include the application causing presentation of presentation driving directions to a physical location of the one or more physical locations in the GUI. As discussed, a computing device 102 may include an application that may provide driving directions to a location utilizing a GPS. The application may update the driving directions based on information received from a location determination device, for example. In embodiments, the application may be the application utilized to purchase the product, e.g., a banking application or a web browser, or another application such as a map application.

In embodiments, the logic flow 300 may include detecting a device associated with one of the one or more physical locations of the product provider at block 320. The detected device may be a server associated with a provider system 104 at the location where the customer is to pick up the product, for example. In one example, the customer's computing device 102 may detect the device based on one or more wireless signals received via a wireless network interface of the computing device 102. Examples of the wireless signals may include WiFi signals, Bluetooth signals, Infrared signals, and so forth. In embodiments, the wireless signal may include an identifier to identify the device and/or provider system 104 to the computing device 102. In some instances, the computing device 102 including the application may detect the server based on information received from the GPS. For example, the application may detect the device based on the current location matching the known location of the provider system 104. In another example, the computing device 102 may include a proximity sensor that may be capable of detecting the device. Embodiments are not limited in this manner.

The logic flow 300 may also include causing one or more of presentation of the digital identification code on a display, communication of the digital identification code via an interface, and/or playing of the digital identification code via a speaker. For example, an application on the computing device 102 may automatically cause the digital identification code to be presented on a display device. The computing device 102 may display a visual representation of the digital identification code in a GUI of the application, for example. The visual representation may be an alphanumeric code that can be entered into an input device of the server or a barcode that can be scanned by the input device. In another example, the application may cause the digital identification code to be automatically, without human intervention, communicated via a networking interface to the server. The digital identification code may be communicated in a secure/encrypted format to the server. In a third example, the application may cause the digital identification code to be automatically played via a speaker of the computing device 102. In some instances, the application may prompt the customer to confirm displaying, communicating and/or playing the digital identification code.

In embodiments, the digital identification code may be provided to the provider system 104 and the provider system 104 may enable the customer to obtain the product. FIG. 4A illustrates an example of a logic flow 400 to enable a customer to obtain a product via a provider system 104. In this example flow 400 one or more operations may be performed by a device, such as a server, of a provider system 104 and may be representative of some or all of the operations executed by one or more embodiments described herein.

At block 405, the logic flow 400 includes receiving an indication of a product purchased and a first instance of a digital identification code. For example, a server of a provider system 104 may receive the indication from a server of a product system 106. The indication may include an identifier to identify the product, e.g., a UPC, a UPI, an MPN, an EPN, or any other type of identifier that may be used to identify the product. The instance of the digital identification code may be generated by the product system 106 and correspond with the product purchased.

At block 410, the logic flow 400 includes receiving an indication of a second instance of a digital identification code from a computing device associated with the customer. For example, the computing device, such as mobile phone may communicate an instance of the digital identification code to the server of the provider system 104 via one or more wireless signals. In another example, the server of the provider system 104 may be coupled with a barcode scanner and the instance of the code may be received via a scan performed by the barcode scanner. In a third example, the server may include and/or be coupled with a microphone that may detect an audio signal of the digital indication code.

The logic flow 400 may include determining whether the first instance of the digital identification code matches the second instance of the digital identification code at block 415. The comparison may be one-to-one comparison comparing each alphanumeric character to each other. In another example, a hash value of each code may be generated and if the hash value matches the codes may match. In a third example, a first set of tones from the first instance may be compared to a second set of tones of the second instance may be compared and may match if they occur at the same relative time. Other techniques may be utilized to compare the first and second instances of the code such as comparing each line of each instance of a barcode, compare points in each instance in a QR code, and so forth.

At block 420, the logic flow includes causing an action in response to determining the first instance matches the second instance. An action may include the provider system 104 determining the instances match and causing one or more signals to be sent to a control device to permit the customer to obtain the product. For example, the provider system 104 may send a signal to unlock an electronic lock of a locked storage box. In another example, the provider system 104 may send a signal to an electronic lock to unlock a door for the customer. In a third example, the provider system 104 may send a signal to cause an ATM to disburse the product. Embodiments are not limited to these examples.

The logic flow 400 may include prohibiting the action in response to determining the first instance does not match the second instance of the digital identification code. For example, the provider system 104 may not verify the customer and may prevent the customer from accessing the product, e.g., send one or more control signals to a control device to prevent access. The provider system 104 may prevent the customer from opening a storage locker door storing the product. In this example, the control device may be an electronically controlled lock on the storage locker to prevent the locker opening. In another example, the provider system 104 may prevent access to the building (door) for the customer. Similarly, the provider system 104 may send one or more signals to a control device such as an electronic lock on the door of the building. In a third example, the product may be stored and/or provided by an ATM and the provider system 104 may prevent the ATM from disbursing the product. In this example, the provider system 104 may send one or more messages including an indication to not dispense the product, e.g., deny the customer access.

In some instances, the provider system 104 may not receive an instance of the digital identification code and verification may be performed by the product system 106. FIG. 4B illustrates an example of a logic flow 450 to enable a customer to obtain a product via a provider system 104 and verification is performed by a product system 106. In this example flow 450 one or more operations may be performed by a device, such as a server, of a provider system 104 and may be representative of some or all of the operations executed by one or more embodiments described herein.

At block 455, the logic flow 450 includes receiving an indication of a product purchased from a server. For example, a server of a provider system 104 may receive the indication from a server of a product system 106, but not an instance of the digital identification code. At block 460, the logic flow 450 includes receiving an indication of an instance of a digital identification code from a computing device associated with the customer.

At block 465, the logic flow 450 includes communicating an indication of the instance of the digital identification code to the server. More specifically, the product system 104 may communicate the digital identification code, received from the computing device 102 to the product system 106. In embodiments, the logic flow 450 may include receiving an indication indicating whether the digital identification code, received from the computing device, is verified or not verified. at block 470 As previously discussed, the product system 106 may perform a verification utilizing the code received from the provider system 104 to verify or not verify the customer. The product system 106 may return a result to the provider system 104.

At block 475, the logic flow 450 includes causing an action in response to the indication indicating the digital identification code and customer is verified or not verified. An action may include causing one or more signals to be sent to a control device to permit the customer to obtain the product if the customer and code are verified. The action may include prohibiting the customer access to the product if the customer and code are not verified.

Figure 5A:
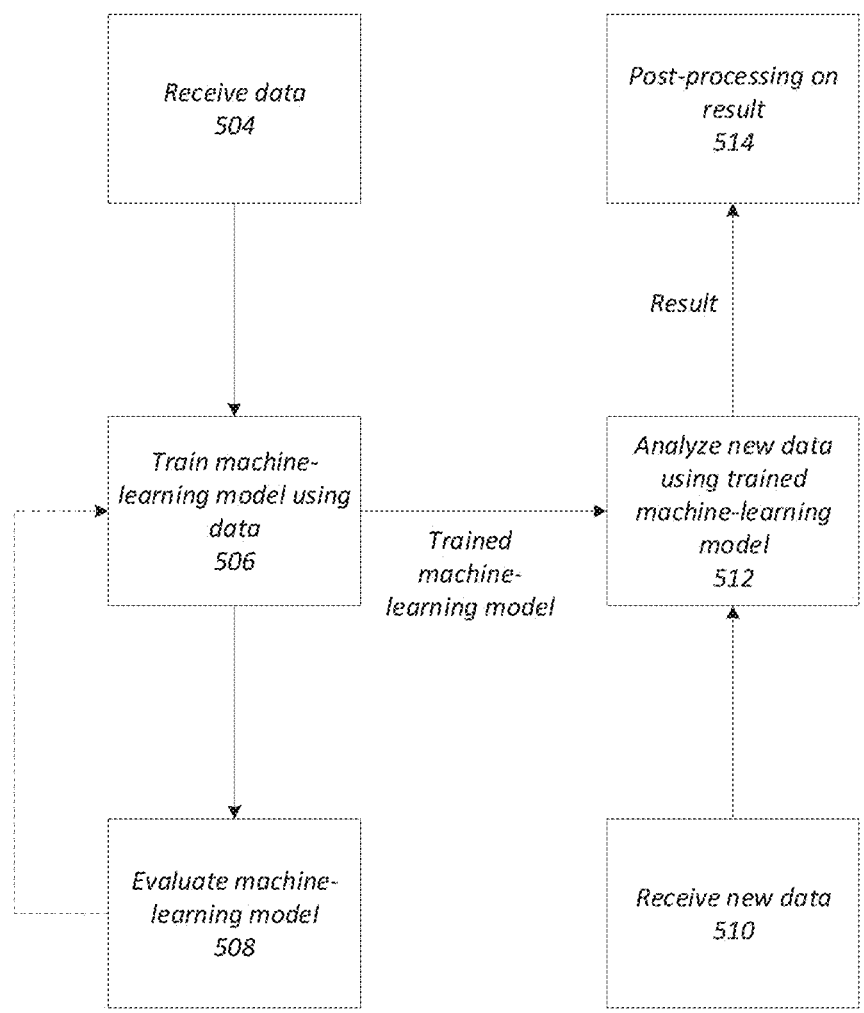
FIG. 5A illustrates an example of a processing flow performed by the system to train and apply model(s).

FIG. 5A illustrates an example of a logic flow 500 for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, predicting customers locations, and so forth.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. The training may also incorporate a clustering technique to cluster or classify data into groups, e.g., customers with similar profiles. In embodiments discussed herein, the training data may include historical data associated with one or more customers. In some aspect, a model may be trained with an individual customer's historical data and the trained model may be used to predict future locations of where the customer may be based on past patterns. In Embodiments may further include training a model for a customer utilizing historical data from a plurality of customers.

In block 504, training data is received. In some examples, the training data is received from a remote database or a local database, constructed from various subsets of data, or input by a user. In embodiments, the training data may include historical data relating to customers and stored in storage, such as storage system 112. The historical data may include historical locations and corresponding time/date stamps times for customers. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data based on travel of previous customers or travelers. For example, the historical data may include information such as, length of travel, date of travel, location of travel, type of travel and so forth. The historical data may also include the profile of the previous customers/travelers. This information may be used to train the models to predict future expenditures, for example. Embodiments are not limited in this manner.

In block 506, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 508, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 506, where the machine-learning model can be further trained using additional training data or otherwise modified to improve accuracy. If the machine-learning model has an adequate degree of accuracy for the particular task, e.g., predicting a future location of a customer, the process can continue to block 510.

In block 510, new data is received. In some examples, the new data is received from a remote database or a local database, constructed from various subsets of data, or input by a user. The new data may be unknown to the machine-learning model. For example, the machine-learning model may not have previously processed or analyzed the new data. In one example, the new data may be received from customers and/or computing devices 102. The new data may include information about the customer's location, date, time, product purchased, and so forth and the profile may include information specific to the customer, as previously discussed.

In block 512, the trained machine-learning model is used to analyze the new data and provide a result, estimated future location and/or location area. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 514, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing. In one example, the result may include an indication of a location, a plurality of locations, and/or a location area and may be provided to the customer and an associated computing device 102.

FIG. 5B illustrates a graphical representation 550 of one or more results that may be determined based on an application of a model to a customer's request. In the illustrated example, a model output a result indicating a location area 520 and three locations (P1, P2, and P3) 522-1 through 522-3 where the customer may pick up a product. In the illustrated example, the location area 520 is illustrated a circle. However, in other instances the shape of the area may be a different shape such as a polygon, square, rectangle, and so forth. In this example, the three locations 522-1 through 522-3 in the location 520 may be determined by the model as having the highest probability of being convenient for the customer based on information in the request and information used to train the model, e.g., historical data, product in the request, current date/time of request, an indication of a time for pickup, current weather conditions, etc. In the illustrated example, three other locations (P4-P6) 524-1 through 524-3 may also be locations that are capable of providing the product but may not be convenient to the customer based on the application of the model.

In embodiments, a computing device 102 of a customer may present the locations in a graphical representation in a GUI in a manner as similarly illustrated in FIG. 5B, e.g., as locations on a GUI map. A customer, via the computing device 102, may select one of the locations. The computing device 102 may generate driving directions to the location and provide an indication to the product system 104 of the selected location. A customer may go to the location and pick up the product, as described above. Note that in some instances, the locations may be presented in a different format, e.g., in a selectable list, a dropdown menu, radial selection list, and so forth.

In some instances, an indication of a location may be sent as a push notification to the customer's computing device 102 such that as the customer drives by a location where the product can be picked up, the customer may receive the notification. In this example, the customer may provide a digital identification code to a device at the location, which may be sent to a product system 106 and verified. The product system 106 may send an indication of whether the customer is verified and the product to provide to the customer.

Figure 6:
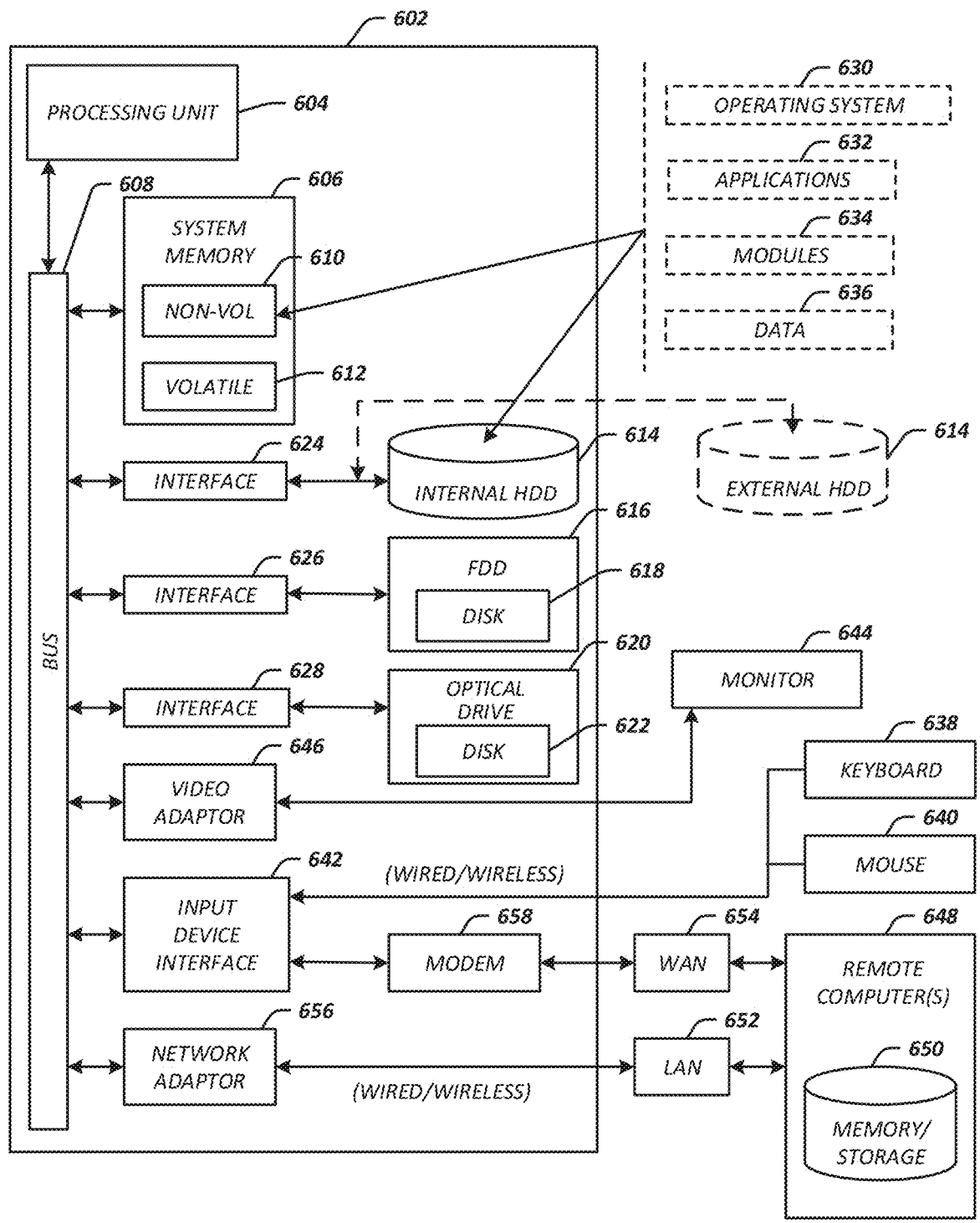
FIG. 6 illustrates an example of a system architecture.

FIG. 6 illustrates an embodiment of an exemplary computing architecture 600 that may be suitable for implementing an apparatus, system, and/or method for performing operations associated with the implementation of one or more of the disclosed techniques. In various embodiments, the computing architecture 600 may comprise or be implemented as part of an electronic device and/or system discussed herein.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604. In some embodiments, processing circuitry of processing unit 604 and/or other processing circuitry of computing architecture 600 may be operative to perform operations associated with logic flows, and/or other operations associated with implementation of one or more of the disclosed techniques. In some embodiments, such processing circuitry may be coupled to a network interface of computing architecture 600.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives.

These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a communication interface coupled with a computing network;
   a processor circuit coupled with the communication interface; and
   a memory coupled with the processor circuit and the communication interface, the memory storing instructions which when executed by the processor circuit, cause the processor circuit to:
   receive, via the communication interface coupled with the computing network, a request from a device associated with a customer, the request comprising information for a product and the customer;
   receive, periodically or semi-periodically, location information associated with the customer prior to training a trained model, the location information for use in training a model to produce the trained model;
   apply the trained model to the information associated with the product and the customer of the request to determine one or more physical locations of a product provider that are near the customer at various times of the day and a convenience probability for each of the one or more physical locations of a product provider to provide the product;
   generate a code associated with the request;
   apply a hashing algorithm to the code to generate a hash value to send to the device associated with the customer and to a system associated with the product provider;
   send, via the communication interface, first information to the device associated with the customer, the first information to include an indication of at least one of the one or more physical locations and the hash value of the code, wherein the indication is based on the convenience probability;
   perform a lookup in a data structure, the lookup being based on the indication of the at least one physical location, to determine the system associated with the product provider to pick up the product; and
   send second information to the system associated with the product provider, the second information to identify the product and the hash value of the code, wherein the system is to use the second information to enable access to the product when an instance of the hash value of the code is provided to the system.

2. The apparatus of claim 1, wherein the information of the request comprises:
   product information to identify the product to purchase,
   customer information to identify the customer associated with the request, and
   location information associated with the customer.

3. The apparatus of claim 2, comprising:
   storage,
   wherein the instructions further cause the processor circuit to:
      determine the trained model to apply to the information of the request based on the customer information to identify the customer associated with the request; and
      retrieve the trained model from the storage.

4. The apparatus of claim 1, wherein the instructions further cause the processor circuit to:
   predict a location area of the customer when applying the trained model to the information of the request;
   determine the one or more physical locations of the product provider within the location area.

5. The apparatus of claim 4, wherein the instructions further cause the processor circuit to:
  determine a physical location of the one or more physical locations of the product provider predicted to be closest to the customer based on the information in the request, wherein the first information to include the physical location of the product provider; and
  send the second information to the system of the product provider at the physical location.

6. The apparatus of claim 4, wherein the instructions further cause the processor circuit to:
  send an indication of each of the one or more physical locations to the device associated with the customer;
  receive an indication of a selection a physical location of the one or more physical locations; and
  send the second information to the system of the product provider at the physical location.

7. The apparatus of claim 1, wherein the instructions further cause the processor circuit to:
  generate the trained model for the customer based on the location information.

8. The apparatus of claim 1, wherein the instructions further the processor circuit to:
  receive, periodically or semi-periodically, location information associated with the customer subsequent to training the trained model; and
  retrain the trained model for the customer based on the location information associated with the customer.

9. The apparatus of claim 1, wherein the code is one of an alphanumeric code, barcode image, or digital audio code; and
  wherein the indication of the first information includes a digital link which when interacted with by a user of the device, causes a map application to open on the device with directions to the at least one of the one or more physical locations.

10. A computer-implemented method, comprising:
  receiving, via a communication interface coupled with a computing network, a request from a device associated with a customer, the request comprising information for a product and the customer;
  receiving, periodically or semi-periodically, location information associated with the customer prior to training a trained model, the location information for use in training a model to produce the trained model;
  applying the trained model to the information associated with the product and the customer of the request to determine one or more physical locations of a product provider that are near the customer at various times of a day and a convenience probability for each of the one or more physical locations of a product provider to provide the product;
  generating a code associated with the request, the code including a digital audio code;
  encrypting the code for sending to the device associated with the customer and to a system associated with the product provider;
  sending first information to the device associated with the customer, the first information to include an indication of at least one of the one or more physical locations and the code, wherein the indication is based on the convenience probability, wherein the digital audio code is configured to be played back via a speaker of the device associated with the customer to the system for verification;
  performing a lookup in a data structure, the lookup being based on the indication of the at least one physical location, to determine the system associated with the product provider to pick up the product; and
  sending second information to the system associated with the product provider, wherein the second information is to identify the product and to be compared with the digital audio code, wherein the system is to use the second information to enable access to the product in response to an instance of the digital audio code being provided to the system and corresponding to the digital audio code received by the system in the second information.

11. The computer-implemented method of claim 10, wherein the information of the request comprises:
  product information to identify the product to purchase,
  customer information to identify the customer associated with the request, and
  location information associated with the customer.

12. The computer-implemented method of claim 11, comprising:
  determining the trained model to apply to the information of the request based on the customer information to identify the customer associated with the request; and
  retrieving the trained model from a storage device.

13. The computer-implemented method of claim 10, comprising:
  predicting a location area of the customer when applying the trained model to the information of the request;
  determining the one or more physical locations of the product provider within the location area.

14. The computer-implemented method of claim 13, comprising:
  determining a physical location of the one or more physical locations of the product provider predicted to have a highest convenience probability, wherein the first information to include the physical location of the product provider; and
  sending the second information to the system of the product provider at the physical location.

15. The computer-implemented method of claim 13, comprising:
  sending an indication of each of the one or more physical locations to the device associated with the customer;
  receiving an indication of a selection a physical location of the one or more physical locations; and
  sending the second information to the system of the product provider at the physical location.

16. The computer-implemented method of claim 10, comprising:
  generating the trained model for the customer based on the location information.

17. The computer-implemented method of claim 10, comprising:
  receiving, periodically or semi-periodically, location information associated with the customer subsequent to training the trained model; and
  retraining the trained model for the customer based on the location information associated with the customer.

18. The computer-implemented method of claim 10, wherein the indication of the first information includes a digital link which when interacted with by a user of the device, causes a map application to open on the device with directions to the at least one of the one or more physical locations.

19. A non-transitory computer-readable storage medium, the computer-readable storage medium including instructions that when executed by a computer, cause the computer to:

receive, via a communication interface coupled with a computing network, a request from a device associated with a customer, the request comprising information for a product and the customer;

receive, periodically or semi-periodically, location information associated with the customer prior to training a trained model, the location information for use in training a model to produce the trained model;

apply the trained model to the information associated with the product and the customer of the request to determine one or more physical locations of a product provider that are near the customer at various times of a day and a convenience probability for each of the one or more physical locations of a product provider to provide the product;

generate a code associated with the request;

apply a hashing algorithm to the code to generate a hash value of the code to send to the device associated with the customer and to a system associated with the product provider;

send first information to the device associated with the customer, the first information to include an indication of at least one of the one or more physical locations and the hash value of the code, wherein the indication is based on the convenience probability;

perform a lookup in a data structure, the lookup being based on the indication of the at least one physical location, to determine the system associated with the product provider to pick up the product; and send second information to the system associated with the product provider, the second information to identify the product and the hash value of the code, wherein the system is to use the second information to enable access to the product when an instance of the hash value of the code is provided to the system.

20. The computer-readable storage medium of claim 19, comprising:

predict a location area of the customer when applying the trained model to the information of the request;

determine the one or more physical locations of the product provider within the location area.

* * * * *